No. 817,854. PATENTED APR. 17, 1906.
G. B. JACOBS.
CANDY CUTTER.
APPLICATION FILED OCT. 13, 1903.
2 SHEETS—SHEET 2.
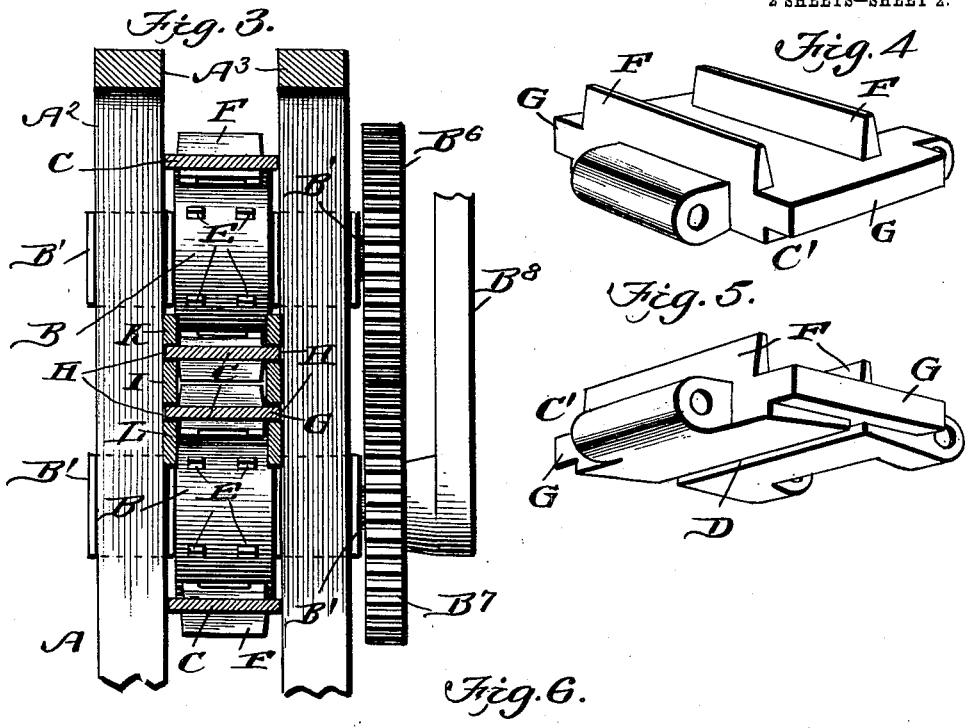
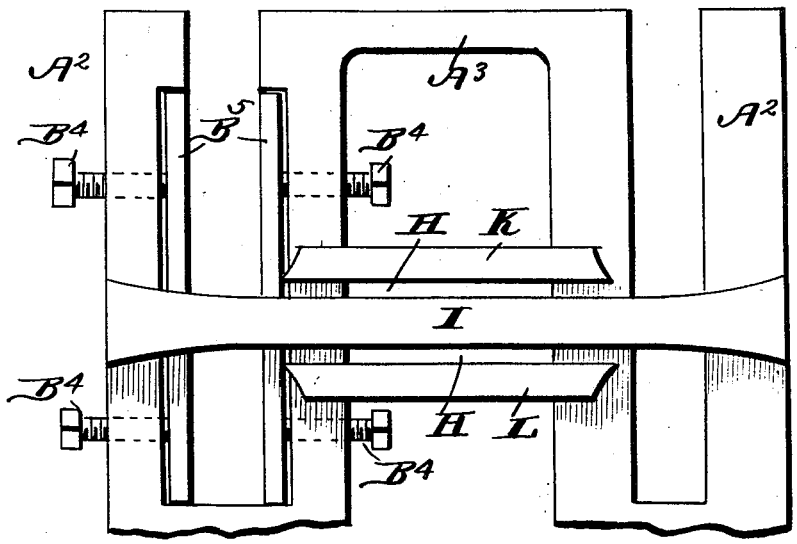
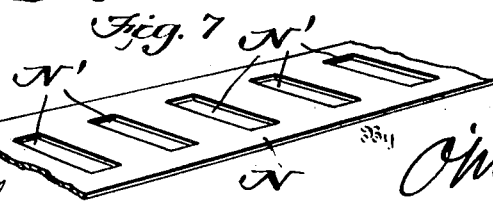
Inventor
G. B. Jacobs.

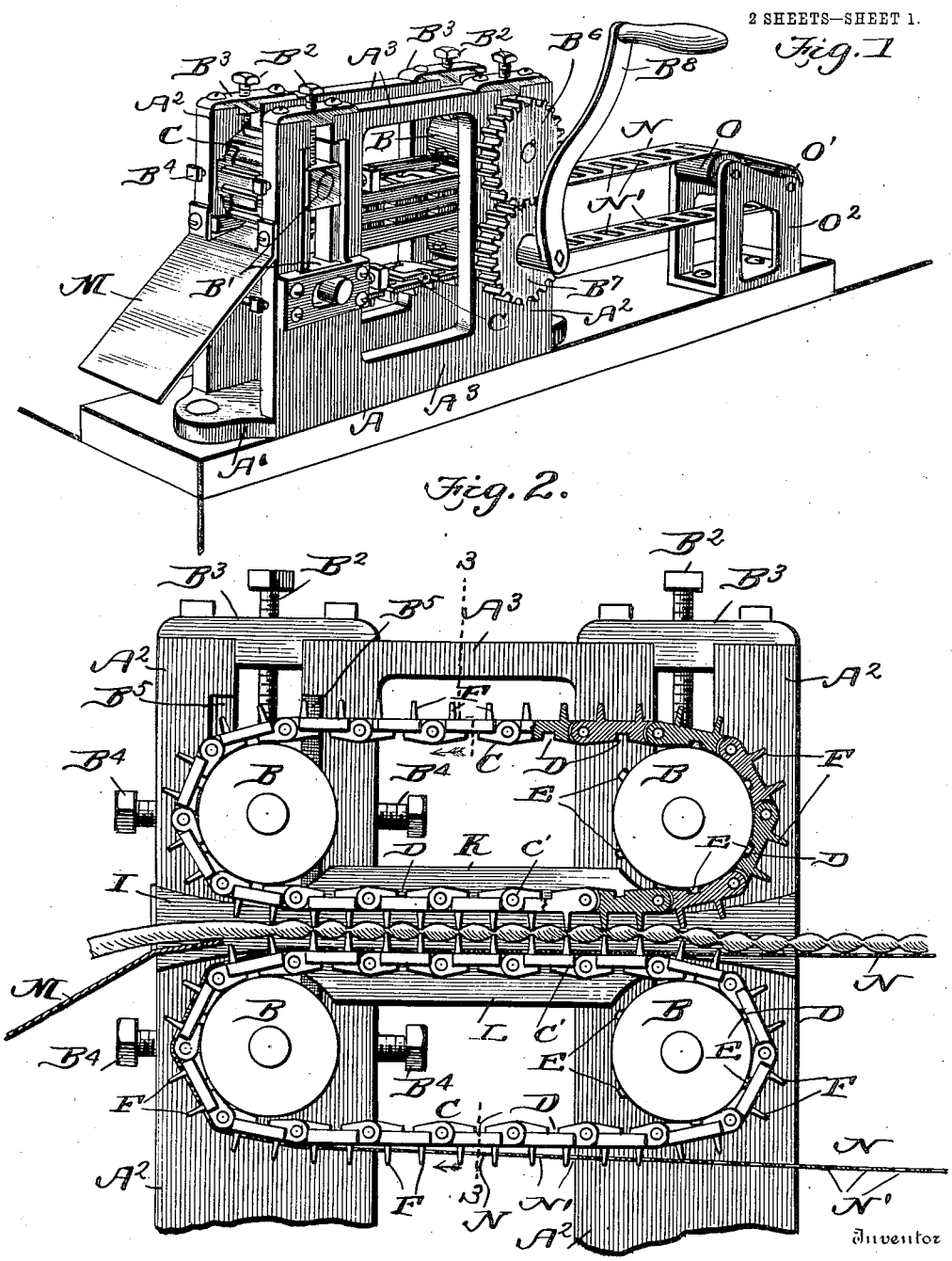

UNITED STATES PATENT OFFICE.

GEORGE B. JACOBS, OF DANVILLE, PENNSYLVANIA.

CANDY-CUTTER.

No. 817,854.     Specification of Letters Patent.     Patented April 17, 1906.

Application filed October 13, 1903. Serial No. 176,862.

*To all whom it may concern:*

Be it known that I, GEORGE B. JACOBS, a citizen of the United States, residing at Danville, in the county of Montour and State of Pennsylvania, have invented a new and useful Candy-Cutter, of which the following is a specification.

This invention covers a machine for cutting candy of the kind known to the trade as "buttercups," which consists of soft center and a covering of harder material. The candy is first prepared in the form of a long strip or billet and then cut up into blocks of the proper size; and it is with the object of providing a machine for the purpose of cutting up the prepared strips I have devised the present form of machine; and another object of the invention is to provide a machine which will simultaneously seal or close the severed ends of the buttercup, thereby preserving the soft interior in good condition.

Another object of the invention is to provide a machine from which the subdivided strip or billet can be run in such a manner that the said strip or billet can be quickly and easily broken up into the finished product.

With these and certain objects in view my invention consists in the employment of a pair of endless chains, movable over and by means of sprocket drums or rolls, said chains being arranged in a frame and movable through guideways carried by the frame, so that the said chains are brought into parallel relation and close proximity during a portion of their flight, each link of said chains being provided with mating knives or projections, whereby the strip or billet of material passed between said chains will be indented or completely severed, as desired, together with means for feeding the material to the chains, means for carrying the product from the machine, and means for operating the sprocket drums or rolls for moving the chains.

The invention consists also in certain details of construction and novelties of combination, all of which will be fully described hereinafter and pointed out in the claims.

In the drawings forming a part of this specification, Figure 1 is a perspective view of a machine constructed in accordance with my invention. Fig. 2 is a sectional elevation, one side of the main frame being removed and one of the endless chains being shown partly in section. Fig. 3 is a sectional view on the line 3 3 of Fig. 2. Fig. 4 is a detail perspective view of one of the links of the chain. Fig. 5 is an inverted perspective view of said link. Fig. 6 is a detail view showing the guideways arranged in connection with the main frame and also the means for adjusting the endless chains, and Fig. 7 is a detail perspective view showing a portion of the delivery-belt.

In constructing the machine in accordance with my invention I employ a main frame A, comprising a base A', slotted upright standards $A^2$, and the connecting portions $A^3$, and this frame may be secured in any suitable manner to a table or other form of support. Sprocket drums or rolls B are journaled in the frame A, the ends of the roll-shafts being mounted in boxes B', arranged in the slotted uprights $A^2$, the upper boxes being adjustable vertically by means of screws $B^2$, working through cross-blocks $B^3$, arranged at the top of each slotted standard. The rolls adjacent the feed end of the machine are also adjusted horizontally by screws $B^4$, passing horizontally through the slotted uprights and bearing upon the adjustable guide-strips $B^5$, located in the recess-faces of the slot in the standard. By means of these adjustments the rolls can be adjusted toward or away from each other both vertically and horizontally. A gear-wheel $B^6$ is mounted upon the end of the upper-roll shaft at the delivery end of the machine, which gear meshes with the similar gear $B^7$, mounted upon the end of the lower-roll shaft, and a crank $B^8$ is also connected to the end of this shaft for the purpose of driving the machine; but it will be understood that other power than hand may be employed for driving the machine, if so desired.

Passing around the upper sprocket-rolls B is an endless chain C, and a similar chain passes around the lower rolls. Each chain C consists of a series of links C' pivotally connected to each other, and each link has a transverse groove D in the inner face thereof, which groove is adapted to be engaged by the sprocket-teeth E of the drum or roll B, so that when the crank is turned the upper and lower rolls B at the delivery end of the machine will be rotated in opposite directions, causing the upper and lower belts to be moved in the directions indicated by the arrows. The outer face of each link is provided with one or more transverse knives or projections F, which are so arranged that they will mate or register with one another when the flights of the chains are brought into proximity and parallel relation with each other, as shown in Fig. 2, and for the purpose of bringing the said flight into such position I construct each link with lateral projections G at opposite ends, which projections are adapted to travel in the horizontal guideways H, formed between the central strips I and the upper and lower strips K and L, connected to the inner faces of the slotted standards, as most clearly shown in Figs. 3 and 6. It will be noted that the opposite faces of the central strip I are curved at the ends of said strip for the purpose of guiding the links into and out of the guideways H.

M indicates a feed-table upon which the strip or billet of candy is placed for the purpose of feeding the same in between the chains, and when the material is introduced between said chains and the crank turned the material will be drawn through with the chains, and inasmuch as the projections, knives, or blades mate or register with one another the strip will be indented to such an extent that the hard outer covering will be sealed at each indentation or intersection, so that when the material is fed from the machine the strip can be quickly and easily broken up into sections, thereby producing the finished product or a quantity or buttercups, and it will be noted that the operation is accomplished as quickly as it is possible to pass the material through the machine, and it will be also noted that only one operation upon the strip or billet is necessary.

While I have shown the transverse knives or blades F as straight, it is obvious that they can be made curved or angular, if desired, so long as they mate or register with one another during the operation of the machine.

For the purpose of delivering the indented or subdivided strip from the machine I employ an endless delivery-belt N, which may be of any length desired and which passes around the lower endless chain, said belt N having a series of openings N', through which the blades or knives F project, the outer end of the belt passing over rollers O and O', mounted in a suitable frame O².

Having thus fully described my invention, what I claim as new, and desire to secure by Letters Patent, is—

1. A device of the kind described comprising a pair of endless chains arranged in vertical alinement, each chain comprising a plurality of links having projections thereon, the projections carried by the links of one chain alining with those of the other chain, and an endless delivery-belt of greater length than the chains running over the lower chain, as and for the purpose set forth.

2. The combination with a frame, of the sprocket-rolls, journaled therein, endless chains passing over the sprocket-rolls and adapted to be brought into parallel relation with each other, each link having a transverse groove upon its inner face intermediate its ends and a projection upon the outer face, adjacent the ends, means for moving the rolls, and guides for guiding the chains.

3. A device of the kind described comprising endless chains formed of links having projections thereon, the chains being arranged in vertical alinement and parallel to each other, and an endless delivery-belt of greater length than the chains running over one of said chains, and having opening therein adapted to aline with the projections on the chain-links.

4. A candy-machine of the kind described comprising sprocket-rollers arranged in upper and lower pairs, and endless chains running over the said rollers, each chain being formed of a plurality of links, each link having projections formed on one face adjacent its ends, laterally-extending longitudinal projections on the sides, and a groove on the other face and intermediate the projections adjacent the ends, said groove being engaged by the sprocket-rollers, and a guideway adjacent the chains adapted to receive the lateral projections.

5. In a machine for forming and delivering a chain of candy buttercups, the combination with a suitable feed, of continuously-driven endless aprons adapted and arranged to squeeze or thin the candy at predetermined points to form an intact chain of buttercups.

6. In a machine for forming and delivering a chain of candy buttercups, the combination with means for feeding a batch of candy in a continuous length, of continuously-driven endless aprons adapted and arranged to squeeze or thin the candy at predetermined points without completely severing the same.

7. In a machine for forming and delivering a chain of candy buttercups, the combination of continuously-driven endless aprons adapted and arranged to squeeze or thin a strip of candy at predetermined points without completely severing the same, and an inclined feed-table up which the strip of candy is drawn by the aprons.

8. In a machine for making candy buttercups, the combination with means for feeding a batch of candy in a continuous length, of endless aprons adapted and arranged to squeeze or thin the candy at predetermined points without completely severing the same, and means for effecting a coincident movement of the aprons.

9. In a machine for making candy buttercups, the combination with means for feeding a batch of candy in a continuous length, of continuously-driven endless aprons adapted and arranged to squeeze or thin the candy at predetermined points without completely severing the same, and means for adjusting one of said aprons in relation to the other.

GEORGE B. JACOBS.

Witnesses:
JOHN R. JACOBS,
JOSEPH BREITENBACH.